United States Patent
Pathak et al.

(10) Patent No.: US 8,856,666 B2
(45) Date of Patent: Oct. 7, 2014

(54) CHASSIS BUTTON TO ACTIVATE GRAPHICAL USER INTERFACE TO ENABLE USER TO SELECT DIAGNOSTIC AND/OR RECOVERY

(75) Inventors: Sanjeev Pathak, Bangalore (IN); Ranjith Kartha, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 12/867,046

(22) PCT Filed: Feb. 6, 2008

(86) PCT No.: PCT/IN2008/000074
§ 371 (c)(1),
(2), (4) Date: Aug. 10, 2010

(87) PCT Pub. No.: WO2009/098703
PCT Pub. Date: Aug. 13, 2009

(65) Prior Publication Data
US 2011/0029886 A1  Feb. 3, 2011

(51) Int. Cl.
*G06F 3/00* (2006.01)
*G06F 9/445* (2006.01)
*G06F 11/07* (2006.01)
*G06F 11/14* (2006.01)

(52) U.S. Cl.
CPC ........ *G06F 11/0793* (2013.01); *G06F 11/1415* (2013.01); *G06F 11/0748* (2013.01); *G06F 11/079* (2013.01); *Y10S 715/965* (2013.01); *Y10S 715/966* (2013.01)

USPC .......... 715/762; 715/741; 715/763; 715/965; 715/966; 713/1; 713/2

(58) Field of Classification Search
USPC ........... 713/1, 2; 715/741, 762, 763, 965, 966
See application file for complete search history.

(56) References Cited

U.S. PATENT DOCUMENTS

| | | | |
|---|---|---|---|
| 5,530,847 A | 6/1996 | Schieve et al. | |
| 6,470,457 B1 * | 10/2002 | Brewer et al. | 713/324 |
| 6,697,963 B1 * | 2/2004 | Nouri et al. | 714/31 |
| 6,763,458 B1 * | 7/2004 | Watanabe et al. | 713/100 |
| 6,889,340 B1 | 5/2005 | Bramley | |
| 7,734,945 B1 * | 6/2010 | Levidow et al. | 714/3 |
| 8,020,097 B2 * | 9/2011 | Moraveji | 715/716 |
| 2002/0083361 A1 * | 6/2002 | Brainard et al. | 714/2 |

(Continued)

FOREIGN PATENT DOCUMENTS

CN  1129845 C  12/2003

OTHER PUBLICATIONS

ThinkWiki, "ThinkPad Button", <URL: http://web.archive.org/web/20070819084238/http://www.thinkwiki.org/wiki/ThinkPad_Button> Aug. 19, 2007, downloaded Aug. 10, 2010.

(Continued)

*Primary Examiner* — Tadeese Hailu

(57) ABSTRACT

A computer comprises a chassis, a button provided on the chassis, and a memory containing executable code. The executable code is caused to execute as a result of a user pressing the button. The code causes a graphical user interface to be displayed to the user providing the user with the ability to choose at least between a computer-diagnostic operation and a recovery operation.

20 Claims, 1 Drawing Sheet

(56) References Cited

U.S. PATENT DOCUMENTS

| | | | |
|---|---|---|---|
| 2002/0154628 A1* | 10/2002 | Akasaka et al. | 370/352 |
| 2002/0162052 A1* | 10/2002 | Lewis | 714/36 |
| 2004/0153724 A1* | 8/2004 | Nicholson et al. | 714/6 |
| 2004/0172578 A1 | 9/2004 | Chen et al. | |
| 2007/0101058 A1* | 5/2007 | Kinnan et al. | 711/114 |
| 2009/0073102 A1* | 3/2009 | Herz et al. | 345/98 |

OTHER PUBLICATIONS

ThinkWiki, "Rescue and Recovery", <URL: http://web.archive.org/web/20070827024701/http://www.thinkwiki.org/wiki/Rescue_and_Recovery>Aug. 27, 2007, downloaded Aug. 10, 2010.

ThinkWiki, "Hidden Proteced Area", <URL: http://web.archive.org/web/20070820162211/http://www.thinkwiki.org/wiki/Hidden_Protected_Area>Aug. 20, 2007, downloaded Aug. 10, 2010.

ISA, PCT International Search Report and Written Opinion, PCT/IN2008/000074, dated Jun. 26, 2008.

IBM. Access IBM & Access Help Customization Guide, Jan. 28, 2013. XP055049518.

* cited by examiner

CHASSIS BUTTON TO ACTIVATE GRAPHICAL USER INTERFACE TO ENABLE USER TO SELECT DIAGNOSTIC AND/OR RECOVERY

BACKGROUND

A computer may experience any of a variety of problems. Examples include hardware failures, software errors, data loss, etc. Often, the user of a computer with such a problem is forced to call for help to, for example, the manufacturer of the computer or an information technologist. The process of obtaining help to diagnostic and repair the problem is inconvenient and time-consuming.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies, may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
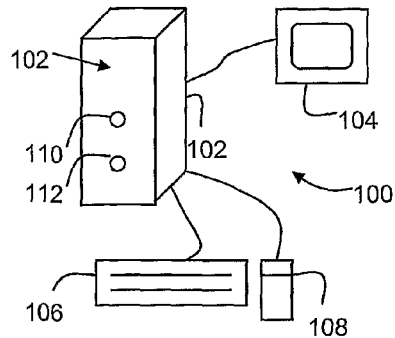
FIG. 1 shows a system in accordance with various embodiments.

FIG. 1 shows a computer system 100 in accordance with various embodiments. Computer system 100 comprises a chassis 102 coupled to a display 104, a keyboard 106 and a mouse or other type of point device 108. The front bezel 109 of the chassis comprises at least two user controls (e.g., buttons). User control 110 is a reset/power on button that is used by a user to turn on the system when the system is otherwise powered off. User control 110 can also be used to reset the system. In accordance with various embodiments, user control 112 is a dedicated control that is only usable, as described below, to initiate a graphical user interface for a user to then initiate a system diagnostics operation and/or a recovery operation. By providing a user control dedicated for this purpose, the system 100 provides an easy and readily accessible mechanism for a user to initiate such operations.

Figure 2:
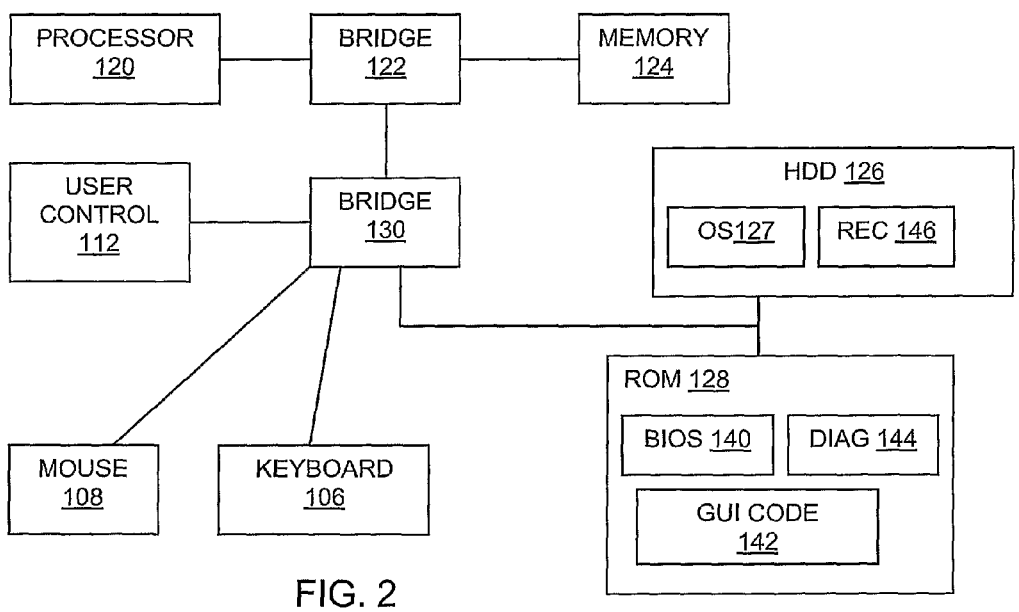
FIG. 2 shows a system diagram in accordance with various embodiments.

FIG. 2 shows a system diagram of system 100. As shown, system 100 comprises a processor 120 and memory 124 coupled to a bridge 122 (e.g., a north bridge). Bridge 122 also couples to another bridge 130 (e.g., a south bridge) which, in turn couples to the user control 112, mouse 108, and keyboard 106. Bridge 130 also couples to one or more types of non-volatile storage such as a hard disk drive (HDD) 126 and a read-only memory (ROM) 128. The ROM 128 comprises any type of ROM such as programmable read-only memory (PROM), electrically-erasable programmable read-only memory (EEPROM), etc. The HDD 126 contains an operating system (OS) 127 and also recovery code 146.

The ROM 128 contains a basic input output system (BIOS) 140 which is executable code that provides access to various to low-level functions of the computer and also provides power-on self test (POST) capability. The BIOS 140 is one of the first pieces of code that runs in the system 100 when the system is first powered on. The ROM 128 may also contain graphical user interface (GUI) code 142 and diagnostic code 144 which are executable by processor 120. In some embodiments, such as that of FIG. 2, the GUI code 142 and diagnostic code 144 are stored in the ROM 128, but in other embodiments, any or both of such codes 142 and 144 are stored elsewhere (e.g., in HDD 126 or in a separate ROM device). Similarly, the recovery code 146 may be stored in the ROM 128. The GUI code 142 may alternatively be implemented as part of the OS 127. Further still, the functionality of the GUI code, described below, may be implemented as part of the BIOS 140 and also as part of the OS 127, or not part of BIOS 140 and OS 127 but still stored in ROM 128 and in HDD 126, so as to be executed during POST as well as during run-time following boot up of the OS 127.

Figure 3:
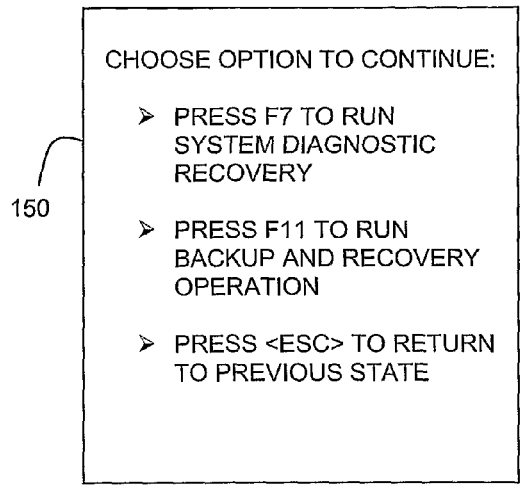
FIG. 3 shows a graphical user interface accordance with various embodiments.

The user control 112 preferably is connected to a general purpose input/output (GPIO) terminal of the bridge 130. Via bridge 130, the user control 112 can be detected as being activated. Upon a user activating user control 112, a system management interrupt (SMI) is asserted that causes the processor 120 to cease its current operations, if any, and execute the GUI code 142. Upon executing the GUI code 142, the GUI 150 of FIG. 3 is provided to the user on display 104. The GUI 150 of FIG. 3 provides the user with a set of choices that comprise, for example, the ability for the user to choose a computer-diagnostic operation to be performed or a recovery operation to be performed. A hot key is associated with each operation. In the example of FIG. 3, the function key F7 is associated with the computer-diagnostic operation. Further, the function key F11 is associated with the recovery operation. Once the GUI 150 of FIG. 3 is shown on display 104, the user can press either the F7 or F11 function keys to activate either the computer-diagnostic or recovery operation as desired. A third option, the escape (ESC) key, can also be pressed to return control back to the previous state, that is, the state of the system 100 at the time the user control 112 was activated by the user.

The GUI code 142 can be executed by a user activating user control 112 during system initialization (boot up) or during run-time, that is, even if the computer is already on and has already been booted up. Because the functionality of the GUI code 142 may be implemented in both the BIOS 140 as well as the OS 127, a user may access the GUI 150 either before or after The diagnostic code 144 causes the system to test one or more functions of the computer system 100 such as memory and reports back the results of tests as well as the configuration of the system (e.g., BIOS version number, type and speed of processor, which ports are enabled, etc.). The recovery code 146 causes the system to restore the factory-installed OS or restore a back-up OS image. The recovery code 146 may also create a back-up copy of the image of the operating system and applications, if any, for future use to restore such an image.

During run-time (user control 112 activated after the OS 127 is loaded), the menu of FIG. 3 is shown to the user by GUI code stored on the HDD 126. If the user opts presses F7 or F11, the GUI code presents another message to the user that informs the user that the system will be shutdown and restarted to run the diagnostics (if the diagnostics option was selected) and that the user should follow the instructions following the restart. Upon restart, the GUI code 142 (in ROM 128) executes and again displays the GUI 150 of FIG. 3 to the user. Again, the user will have to press F7, if the user desires to run diagnostics on the computer system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer, comprising:
   a chassis;
   a button provided on said chassis; and
   a memory containing executable code;
   wherein the executable code is caused to cease current operations and execute as a result of a user pressing the button, said code causes a graphical user interface to be displayed to the user providing the user the ability to choose at least between a computer-diagnostic operation and a recovery operation.

2. The computer of claim 1 wherein the button is dedicated for exclusive use in providing a user access to said graphical user interface.

3. The computer of claim 1 wherein the memory comprises read-only memory.

4. The computer of claim 1 wherein code that performs the computer-diagnostic operation and the recovery operation is in read-only memory.

5. The computer of claim 1 wherein the code is executed upon a user pressing the button even if the computer is already on and has been booted up.

6. The computer of claim 1 further comprising a first hot key associated with the computer-diagnostic operation and a second hot key associated with the recovery operation.

7. The computer of claim 1 wherein pressing an ESC key returns control back to a previous state.

8. The computer of claim 7 wherein the previous state is a system state at a time when the button is pressed.

9. The computer of claim 1 wherein the recovery operation restores a factory-installed operating system.

10. The computer of claim 1 wherein the recovery operation restores a back-up operating system.

11. The computer of claim 1 wherein the recovery operation creates a back-up copy of an image of an operating system and applications for future use to restore the image.

12. A computer, comprising:
    a chassis;
    a button provided on said chassis; and
    a memory containing executable code;
    wherein, while the computer is on and has already booted, the executable code is caused to assert a system management interrupt (SMI) that causes a processor to cease current operations and execute and display a graphical user interface, said code causes either of a computer-diagnostic operation and recovery operation to be performed.

13. The computer of claim 12, wherein the code causes the graphical user interface to be displayed to the user providing the user to ability to choose between said computer-diagnostic recovery operations.

14. The computer of claim 13 wherein the button is dedicated for exclusive use in providing a user access to said graphical user interface.

15. The computer of claim 12 wherein the button is dedicated for exclusive use in causing either of said computer-diagnostic and recovery operations to be performed.

16. The computer of claim 12 wherein the memory comprises read-only memory.

17. A computer-implemented method, comprising:
    activating a user-control on a computer chassis of a computer; and
    based on the user-control being activated, asserting an interrupt to cease current processor operations and displaying a graphical user interface providing a user the ability to choose at least between a computer-diagnostic operation and a recovery operation.

18. The method of claim 17 further comprising performing said computer-diagnostic operation upon a user choosing the computer-diagnostic operation in the graphical user interface.

19. The method of claim 17 further comprising performing said recovery operation upon a user choosing the recovery operation in the graphical user interface.

20. The method of claim 17 wherein activating the user-control occurs when the computer is already on and initialized.

* * * * *

UNITED STATES PATENT AND TRADEMARK OFFICE
CERTIFICATE OF CORRECTION

| | | |
|---|---|---|
| PATENT NO. | : 8,856,666 B2 | Page 1 of 1 |
| APPLICATION NO. | : 12/867046 | |
| DATED | : October 7, 2014 | |
| INVENTOR(S) | : Sanjeev Pathak et al. | |

It is certified that error appears in the above-identified patent and that said Letters Patent is hereby corrected as shown below:

On the Title Page, Item (54), and in the Specification, in column 1, line 3, Title, delete "DIAGNOSTIC" and insert -- DIAGNOSTICS --, therefor.

Signed and Sealed this
Tenth Day of March, 2015

Michelle K. Lee
*Deputy Director of the United States Patent and Trademark Office*